United States Patent
Zhan

(10) Patent No.: US 10,145,502 B2
(45) Date of Patent: Dec. 4, 2018

(54) LARGE-APERTURE SPIRAL WELDED STEEL PIPE WITH METAL LININGS AND MANUFACTURING METHOD THEREOF

(71) Applicant: NANJING LIANZHONG CONSTRUCTION ENGINEERING TECHNOLOGY CO., LTD., Nanjing, Jiangsu (CN)

(72) Inventor: Fujun Zhan, Nanjing (CN)

(73) Assignee: NANJING LIANZHONG CONSTRUCTION ENGINEERING TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 15/026,138

(22) PCT Filed: Dec. 30, 2014

(86) PCT No.: PCT/CN2014/095449
§ 371 (c)(1),
(2) Date: Mar. 30, 2016

(87) PCT Pub. No.: WO2016/101298
PCT Pub. Date: Jun. 30, 2016

(65) Prior Publication Data
US 2016/0356413 A1  Dec. 8, 2016

(30) Foreign Application Priority Data
Dec. 24, 2014  (CN) .......................... 2014 1 0815765

(51) Int. Cl.
*F16L 58/00* (2006.01)
*F16L 9/153* (2006.01)
(Continued)

(52) U.S. Cl.
CPC ............... *F16L 58/00* (2013.01); *F16L 9/047* (2013.01); *F16L 9/153* (2013.01); *F16L 9/165* (2013.01); *F16L 57/06* (2013.01); *F16L 58/08* (2013.01)

(58) Field of Classification Search
CPC . F16L 9/047; F16L 9/153; F16L 57/06; F16L 58/08
(Continued)

(56) References Cited

U.S. PATENT DOCUMENTS 2,054,939 A * 9/1936 Larson ................. B23K 9/0043
138/141
3,735,478 A * 5/1973 Porter .................. B21C 37/122
228/144
(Continued)

FOREIGN PATENT DOCUMENTS

CN  201028144 Y   2/2008
CN  101675285 A   3/2010
(Continued)

OTHER PUBLICATIONS

Sep. 30, 2015 International Search Report issued in International Patent Application No. PCT/CN2014/095449.

*Primary Examiner* — Craig Schneider
*Assistant Examiner* — David Deal
(74) *Attorney, Agent, or Firm* — Oliff PLC

(57) ABSTRACT

A large-aperture spiral welded steel pipe with metal linings and a manufacturing method thereof, wherein the pipe includes a pipe body spirally winded by a main steel belt; a first lining and a second lining are arranged on a body inner wall, the first lining is spirally laminated on the main steel belt surface, the first lining width is smaller than the main steel belt width, the second lining is spirally laminated on a spiral seam formed between adjacent pipe bodies, the second lining left and right sides are respectively welded with (Continued)

the adjacent first lining, and the first lining and the second lining cover the inner wall of the entire body; and a reinforcement ring with a semi-closed section is spirally arranged along a body outer wall, and a spiral passage is formed between the inner wall of the reinforcement ring and the body outer wall.

12 Claims, 4 Drawing Sheets

(51) Int. Cl.
*F16L 9/04* (2006.01)
*F16L 9/16* (2006.01)
*F16L 57/06* (2006.01)
*F16L 58/08* (2006.01)

(58) Field of Classification Search
USPC ....... 138/144, 143, 150, 153, 154, 173, 121, 138/122
See application file for complete search history.

(56) References Cited

U.S. PATENT DOCUMENTS

| | | | | |
|---|---|---|---|---|
| 4,029,932 A | * | 6/1977 | Cook | B23K 26/0823 138/144 |
| 5,316,606 A | * | 5/1994 | Andre | B21C 37/123 156/201 |
| 5,325,893 A | * | 7/1994 | Takagi | F16L 9/003 138/143 |
| 5,454,402 A | * | 10/1995 | Andre | F16L 57/06 138/122 |
| 6,186,182 B1 | * | 2/2001 | Yoon | F16L 9/06 138/121 |
| 2004/0025951 A1 | * | 2/2004 | Baron | F16L 55/165 138/98 |
| 2010/0139848 A1 | | 6/2010 | Burke et al. | |

FOREIGN PATENT DOCUMENTS

| | | | |
|---|---|---|---|
| CN | 202302347 U | | 7/2012 |
| CN | 103557381 A | * | 2/2014 |
| CN | 203892733 U | | 10/2014 |
| CN | 204420341 U | | 6/2015 |

* cited by examiner

LARGE-APERTURE SPIRAL WELDED STEEL PIPE WITH METAL LININGS AND MANUFACTURING METHOD THEREOF

FIELD OF THE INVENTION

The present invention relates to a steel pipe and a manufacturing method thereof, and in particular to a large-aperture spiral welded steel pipe with metal linings and a manufacturing method thereof.

BACKGROUND OF THE INVENTION

At present, pipelines are usually used for conveying fluid, common pipelines include cement pipes, plastic pipes, ordinary carbon steel pipes, stainless steel pipes and galvanized steel pipes, etc. Wherein, the cement pipe is a prefabricated pipe which is manufactured by means of the centrifugal force principle with cement and reinforcing steel bars as materials, the overall construction cost of the cement pipe is low, but the cement pipe is likely to leak and is poor in internal pressure resistance, so that the cement pipe cannot be used as a water supply pipe and can be only used as a drain pipe, meanwhile, the aperture of the cement pipe cannot be too large and can be generally 3 meters or less, each pipe cannot be too long, resulting in numerous joints, so that the construction is difficult, and meanwhile, a foundation must be made during the construction, thus the construction cost is high. The plastic pipe is made in a pipe making machine in an extrusion processing manner by adding a stabilizer and other additives, with plastic resin as a raw material, the plastic pipe is small in mass and is convenient to process, but the aperture of the plastic pipe cannot be too large, and the plastic pipe is low in mechanical strength, poor in damage resistance, non-wear resistant, non-high temperature resistant and is liable to age. The ordinary carbon steel pipe is a steel pipe made of carbon steel, the inner wall of the ordinary carbon steel pipe is not wear resistant, the aperture cannot be made too large, because when the aperture is large, the pipe wall is thickened, resulting in a high cost. The cost of the stainless steel pipe is too high. The aperture of the galvanized steel pipe cannot be too large, galvanization is a pollution industry which generates large environmental damage, and a zinc coating is relatively thin, and the general thickness is less than 0.1 mm, thereby being easy to damage. Therefore, aiming at the shortcomings of the above pipelines, a novel pipe body capable of solving the above problem needs to be researched urgently.

SUMMARY OF THE INVENTION

Purpose of the Invention: a first purpose of the present invention is to provide a spiral welded steel pipe with metal linings, which improves the corrosion resistance and abrasion resistance, and has a large aperture and a thin pipe wall; and a second purpose of the present invention is to provide a manufacturing method of the steel pipe.

Technical Solution: the steel pipe of the present invention includes a pipe body spirally winded by a main steel belt; a first lining and a second lining are arranged on an inner wall of the pipe body, the first lining is spirally laminated on the surface of the main steel belt, the width of the first lining is smaller than the width of the main steel belt, the second lining is spirally laminated on a spiral seam formed between adjacent pipe bodies, left and right sides of the second lining are respectively welded with the adjacent first lining, and the first lining and the second lining cover the inner wall of the entire pipe body; and a reinforcement ring with a semi-closed section is spirally arranged along an outer wall of the pipe body, and a spiral passage is formed between the inner wall of the reinforcement ring and the outer wall of the pipe body.

Wherein, the first lining or the second lining is welded with the main steel belt.

An air hole for emptying air between the main steel belt and the first lining or the second lining is arranged on the first lining or the second lining.

The passage between the inner wall of the reinforcement ring and the outer wall of the pipe body is filled with antiseptic liquid.

The first lining or the second lining is lining steel made of special alloy steel, stainless steel, wear-resistant steel, aluminum or copper.

The manufacturing method of the steel pipe of the present invention includes the following steps:

a reinforcement ring steel belt with a semi-closed section is laminated on the lower surface of the main steel belt, and a first lining steel belt is laminated on the upper surface of the main steel belt to form a composite main steel belt, wherein the width of the first lining steel belt is smaller than the width of the main steel belt;

the composite main steel belt is spirally winded to the spiral welded steel pipe with the first lining on the inner wall and the reinforcement ring on the outer wall, and meanwhile, the spiral passage is formed between the inner wall of the reinforcement ring and the outer wall of the pipe body of the steel pipe; and the second lining is spirally winded on the spiral seam formed by adjacent pipe bodies, moreover, left and right sides of the second lining are respectively welded with the adjacent first lining, and the first lining and the second lining cover the inner wall of the entire spiral welded steel pipe.

Wherein, after the spiral welded steel pipe is manufactured, interlayer gaps formed by the main steel belts on both ends thereof and the first lining or the second lining are sealed and welded to form sealed spaces between the main steel belts and the lining.

An air hole for emptying air between the main steel belt and the first lining or the second lining is arranged on the first lining or the second lining. The interior of the air hole can be vacuumized or filled with an inert gas.

The passage between the inner wall of the reinforcement ring and the outer wall of the pipe body is filled with antiseptic liquid.

Further, after being manufactured, the spiral welded steel pipe is cut into segments, and a welding groove between two adjacent segments of steel pipes is Y-shaped.

When the composite main steel belt is spirally winded to form the steel pipe, the main steel belt is welded in a submerged-arc welding manner. The welding manner between the second lining and the first lining, or the welding manner between the main steel belt and the first lining or the second lining is gas shielded welding.

Beneficial Effects: compared with the prior art, the present invention has the following remarkable advantages:

(1) the metal linings are arranged on the inner wall of the steel pipe of the present invention to improve the corrosion resistance and the abrasion resistance of the steel pipe and avoid fluid pollution; meanwhile, the thickness of the main steel belt is decreased to reduce the material cost; the second lining covers the spiral weld formed by the steel pipe per se to reduce the impact force of internal fluid on the weld, so as to protect the weld; and since the width of the second lining is relatively small, relatively large weld density of the linings and the pipe wall of the main steel pipe can be guaranteed.

(2) The semi-closed reinforcement ring is arranged on the outer wall of the steel pipe of the present invention, so that the second moment of area in the circumferential direction of the pipe wall is much higher than that of a common reinforcement manner, and the bearing capacity is improved, and the wall thickness of the main steel belt is much smaller than that of a common steel pipe, so that the material cost is reduced; and meanwhile, the second moment of area of the main steel belt is greatly improved, and a thin plate can be transferred during rounding.

(3) Both end parts of the steel pipe cut into segments in the present invention can be sealed and welded to eliminate the gaps between the lining pipes and the end parts of the main steel pipe.

(4) Air holes or air taps can be arranged on the linings on both ends of each segment of pipe in the present invention, and the air holes or air taps are vacuumized or filled with the inert gas to prevent corrosion of the pipe wall.

(5) The antiseptic liquid can be filled in the reinforcement ring in the present invention to improve the corrosion resistance of the reinforcement ring.

(6) The method of the present invention can be used for manufacturing a steel pipe with an ultra large aperture.

(7) The steel pipe of the present invention can be used for conveying special media, for example, corrosive media, media with higher purity requirements, high temperature media, etc.

(8) When the steel pipe of the present invention is used as a buried pipe, by means of a shared soil-pipe stress effect, the reinforcement ring mainly bears the pressure, and when the steel pipe has an ultra large diameter (D is larger than 4 m), the steel pipe can be buried in a large depth, which is larger than 10 m. Meanwhile, high-performance concrete can be filled in the reinforcement ring to increase the second moment of area in the pipe wall, change the reinforcement ring into a concrete steel pipe, improve the compressive capacity and reduce the thickness of the pipe wall.

DETAILED DESCRIPTION OF THE EMBODIMENTS

Technical solutions of the present invention will be further illustrated below in detail in combination with the accompany drawings.

According to the large-aperture spiral welded steel pipe (referred to as a steel pipe below) with metal linings of the present invention, a reinforcement structure (a reinforcement ring 400 in the present invention) is arranged on an outer wall of a pipe body 101 of the steel pipe and is processed by multiple common steel belts, and the common steel belts are uniformly twisted in a spiral manner and are welded on the outer wall of the pipe body for improving the second moment of area in a circumferential direction of the pipe wall, reducing the thickness of the pipe wall and facilitating subsequent rounding. The metal linings are arranged on the inner wall of the steel pipe, the linings include a first lining 200 and a second lining 300, the two linings are entirely covered on the inner wall of the steel pipe to form a lining pipe body welded with the inner wall of the steel pipe, so that the corrosion resistance and the abrasion resistance of the steel pipe can be improved, pollution of fluid flowing by the steel pipe is avoided, and meanwhile, the wall thickness of the steel pipe can also be reduced, in addition, the linings can be made of a special material, the steel pipe body is made of a common material, in this way, not only is the overall performance of the steel pipe improved, but also the cost is lowered to improve the market competitiveness of the steel pipe. To further prolong the service life of the steel pipe, both ends of each segment of steel pipe should be sealed and welded, gaps between the linings at both ends of the steel pipe and the pipe body are sealed and welded to provide a sealed space, in order to isolate the external air and the air in the gaps. In addition, air holes or air taps can be arranged on the linings at both ends of the steel pipe for vacuumizing the gaps between the linings and the pipe wall or filling an inert gas, and the air holes are sealed and welded finally. An antiseptic material can also be filled in the reinforcement ring, for example, antiseptic paint.

The manufacturing process of the steel pipe will be introduced below:

at first, a forming angle of a spiral shaping machine is adjusted to a proper value according to the diameter of the manufactured steel pipe.

Figure 1:
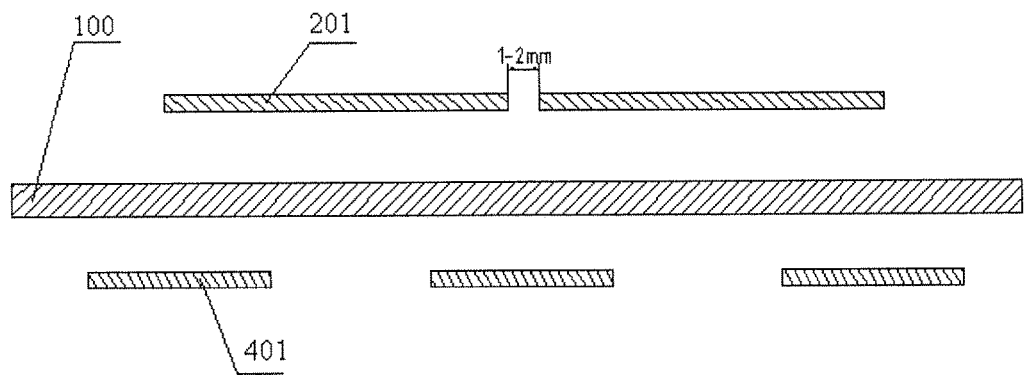
FIG. 1 is a schematic diagram of placement positions of a main steel belt, a reinforcement ring steel belt and a lining steel belt.

Then, a main steel belt 100, a reinforcement ring steel belt 401, a first lining steel belt 201 and a second lining steel belt 301 are prepared. Rust removal and shot blasting are carried out on the main steel belt 100, and after unreeling, leveling, edge trimming and other procedures, the reinforcement ring steel belt 401 and the first lining steel belt 201 (the number is set according to actual conditions) are arranged according to the positions as shown in FIG. 1. In the current manufacturing process, three reinforcement ring steel belts 401 are uniformly distributed below each main steel belt 100, two first lining steel belts 201 are arranged at the upper side, and the distance between the two first lining steel belts 201 is 1-2 mm.

Figure 2:
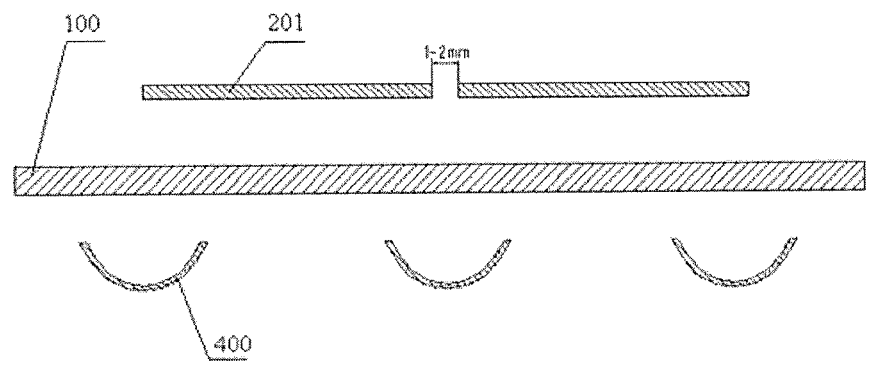
FIG. 2 is a schematic diagram of a structure of a reinforcement ring steel belt with a semi-closed section and processed by the reinforcement ring steel belt.

As shown in FIG. 2, the reinforcement ring steel belt 401 is bent into a reinforcement ring 400 with a semi-closed section by a bending mechanism, in the current manufacturing process, the section of the reinforcement ring 400 is processed to a semicircle, and of course, the section can be processed to other shapes according to actual demands, for example, a trapezoid, a parabolic shape, etc.

Figure 3:
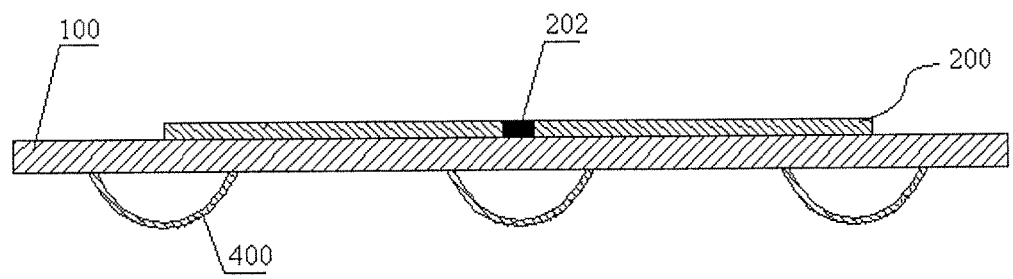
FIG. 3 is a schematic diagram of a structure after the reinforcement ring steel belt and the lining steel belt are respectively laminated with the main steel belt.
Figure 4:
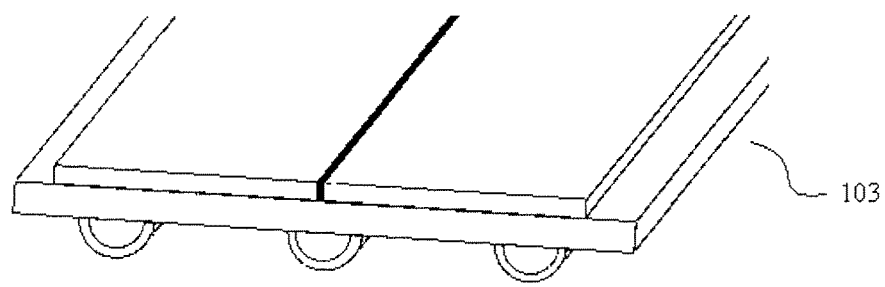
FIG. 4 is a schematic diagram of a three-dimensional structure of a composite main steel belt.

As shown in FIG. 3, the reinforcement ring 400 is moved upwards to be laminated with the main steel belt 100, and specifically, both end ports of the reinforcement ring 400 are welded with contact positions on the lower surface of the main steel belt 100. Meanwhile, the first lining steel belts 201 are moved downwards to be laminated with the upper surface of the main steel belt 100, specifically, the two first lining steel belts 201 and the main steel belt 100 are welded in a triune manner by gas shielded welding, wherein a first weld 202 is formed between the two first lining steel belts 201. In this way, a composite main steel belt 103 is obtained, as shown in FIG. 4.

Figure 5:
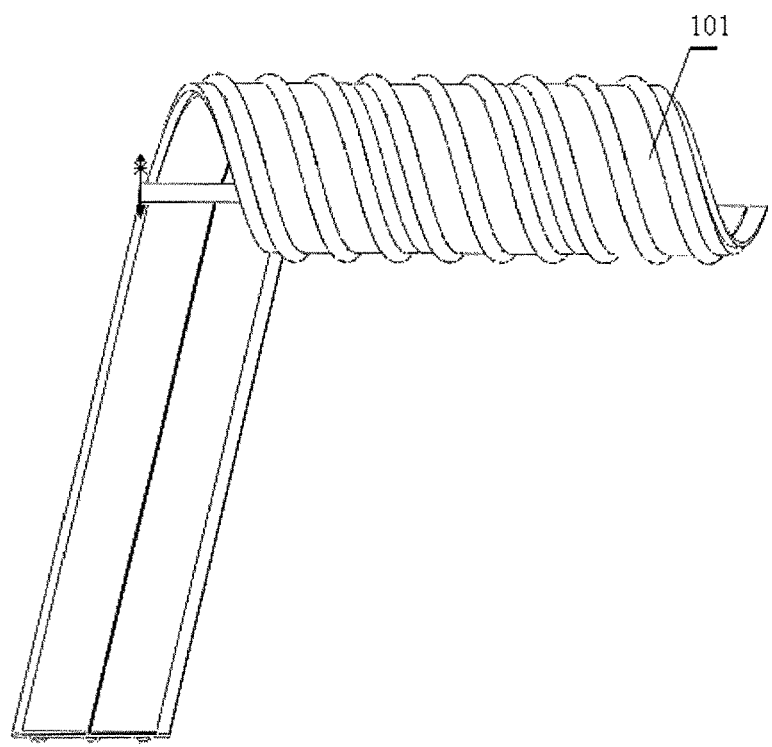
FIG. 5 is a schematic diagram of a structure in which the composite main steel belt is three-roller rounded into a steel pipe.
Figure 6:
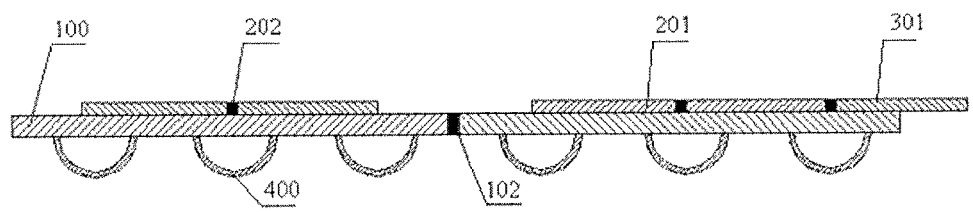
FIG. 6 is a schematic diagram of a structure of docking front and back joints of adjacent pipe bodies.
Figure 7:
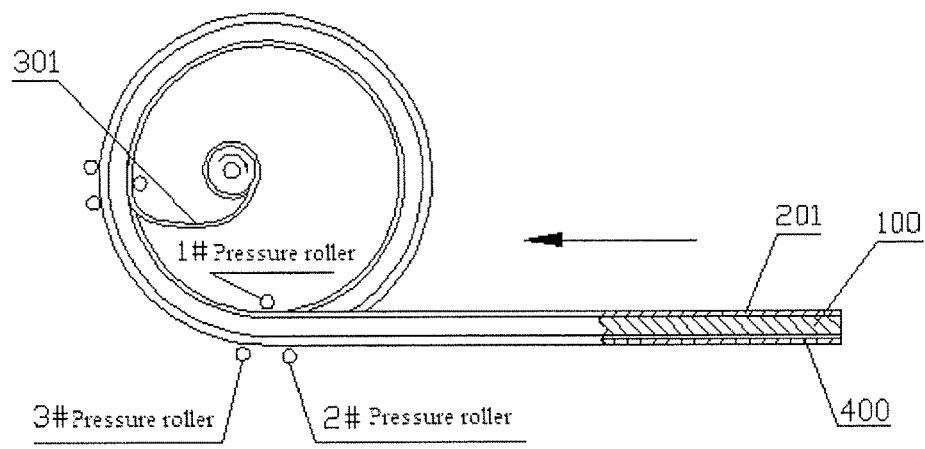
FIG. 7 is a schematic diagram of pavement of a second lining steel belt.
Figure 8:
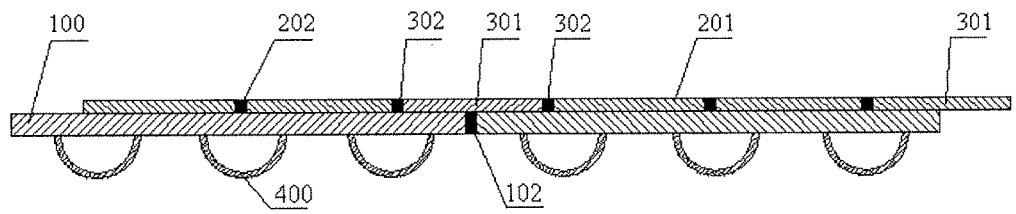
FIG. 8 is a schematic diagram of a structure in which a first lining steel belt and the second lining steel belt entirely cover an inner wall of the steel pipe.

The composite main steel belt 103 is conveyed into a three-roller rounding mechanism (referring to FIG. 7, including a first pressure roller, a second pressure roller and a third pressure roller) to be rounded, as shown in FIG. 5. Since the semi-closed reinforcement ring is arranged on the outer wall, the second moment of area of the main steel belt is greatly improved, and thin plate can be transferred during rounding. During rounding, the main steel belt forms joints of pipe bodies, a spiral seam 102 (the seam formed by the main steel belt per se) formed between adjacent pipe bodies is welded, as shown in FIG. 6 and FIG. 7, wherein the position of the first pressure roller is a welding point. Then, with the first pressure roller as a starting point, 200-300 mm is retreated (the position of the roller at the left upper side in FIG. 7), and the second lining steel belt 301 is paved and covered at the spiral seam 102 to reduce the impact force of the fluid in the pipeline on the seam, so as to protect the seam. Meanwhile, the second lining steel belt 301 is welded with the adjacent first lining steel belt 201 to form a sealing weld 302, as shown in FIG. 7 and FIG. 8, that is, the second lining steel belt 301, the first lining steel belt 201 and the main steel belt 100 are welded in the triune manner. In this way, the pipe body of the entire steel pipe is completely covered by multiple spiral linings (the first lining 200 and the second lining 300), and the linings are firmly welded on the inner wall of the pipe body to obtain the steel pipe with the linings.

The lining steel belt has certain property different from that of common carbon steel, for example, corrosion resistance, abrasion resistance, high temperature resistance and the like, the material variety includes, but not limit to, the following: special alloy steel, stainless steel, wear-resistant steel, aluminum or copper. The widths of the first lining and the second lining are generally different, the wider first lining (the width thereof is smaller than that of the main steel belt) is paved on the upper surface of the main steel belt, the slightly narrower second lining is paved at the spiral seam 102 on the inner wall, and since the second lining is slightly narrower, larger weld density of the lining and the inner wall of the pipe body can be guaranteed.

Figure 9:
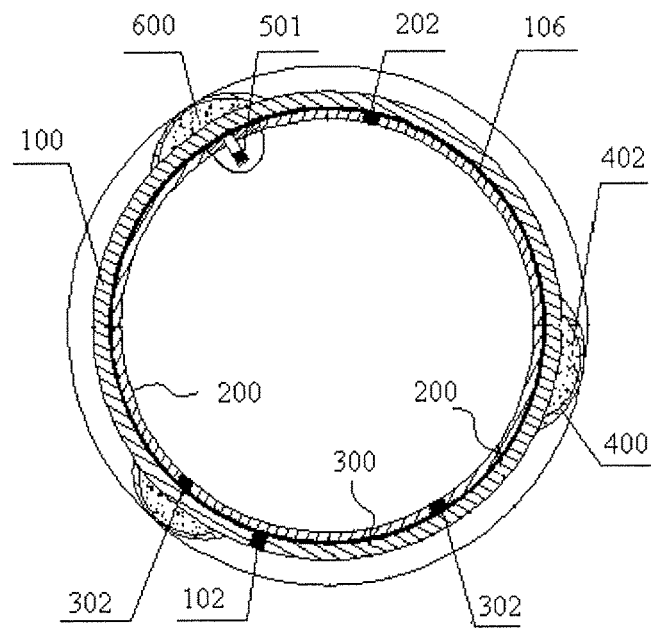
FIG. 9 is a cross section view of the steel pipe of the present invention.
Figure 10:
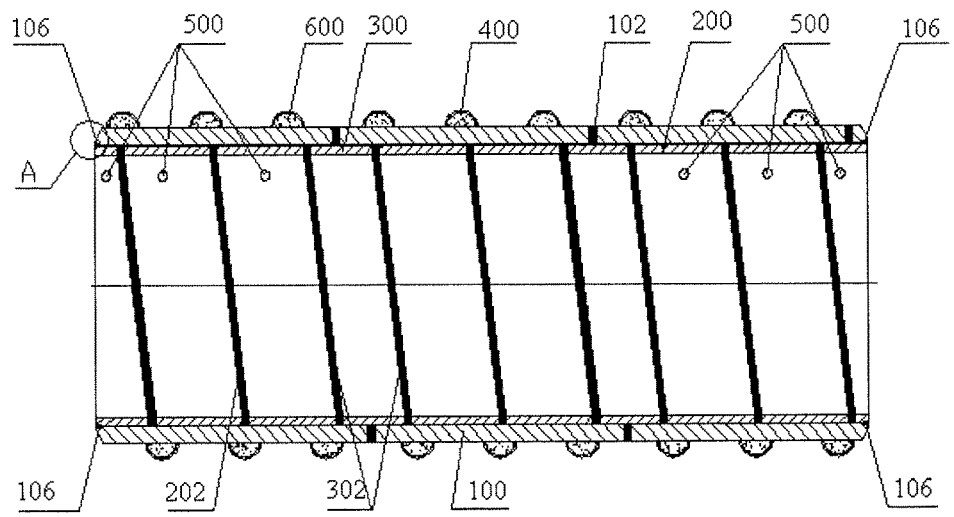
FIG. 10 is a longitudinal sectional view of the steel pipe of the present invention.
Figure 11:
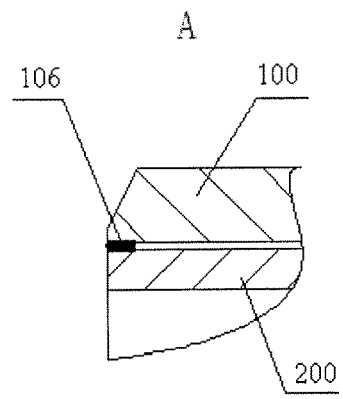
FIG. 11 is a partial enlarged drawing of an A point in FIG. 10.
Figure 12:
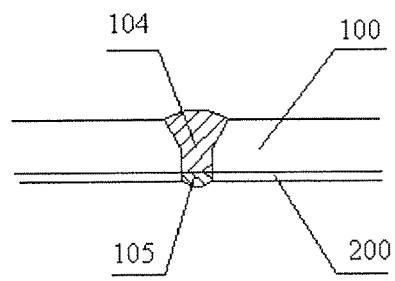
FIG. 12 is a schematic diagram of an end part welding structure between segments of the steel pipe of the present invention.

As shown in FIG. 9 and FIG. 10, after reaching a required length, the steel pipe is cut off, interlayer gaps 106 formed by the main steel belts 100 on both ends thereof and the first lining 200 or the second lining 300 are sealed and welded to form sealed spaces between the main steel belts and the lining steel belt, for facilitating subsequent treatment, for example, filling and exhausting air. An air hole 500 is formed on the side face or the top of the lining on the inner wall of the pipe body 101, the depth of the air hole 500 is only large enough to penetrate through the lining without touching the main steel belt, an air tap 501 (if necessary) can be welded on the air hole 500 to conveniently connect an air device. At least one air hole can be formed in each lining at the pipe end, and if 4 linings are arranged, at least 4 air holes can be formed in each end. The air between the main steel belt and the linings can be exhausted from the air holes to prevent corrosion of the pipe body, meanwhile, the quality of the weld is detected by means of the process, and then the air hole 500 and the air tap 501 are sealed and welded.

At a reinforcement ring notch 402 formed at the end part of the steel pipe which is cut into segments, antiseptic liquid is filled in the reinforcement ring notch 402, when a formed liquid column (can be larger than the perimeter of ⅓ reinforcement ring) is flush with a filling opening, the pipe body 101 is rotated, the residual antiseptic liquid flows out from the notch at the other end of the steel pipe at last, therefore, the space between the inner wall of the reinforcement ring of the entire steel pipe and the outer wall of the steel pipe is covered by the antiseptic liquid, so that the corrosion resistance of the inner wall of the reinforcement ring can be improved. When the pipeline is buried underground, high-performance concrete 600 can be filled in the reinforcement ring to change the reinforcement ring into a concrete steel pipe, improve the compressive capacity and reduce the thickness of the pipe wall of the main steel pipe.

The welding methods of different positions of the steel pipe of the present invention are different, for example, when segments of the steel pipe are connected, the welding parts should be processed into Y-shaped grooves, the main steel belt is welded by submerged-arc welding 104, and the welding between the linings and between the linings and the main steel belt is gas shielded welding 105.

Principle of the Invention: at first, the semi-closed reinforcement ring is arranged on the outer wall of the spiral welded steel pipe, first, the second moment of area in the circumferential direction of the pipe wall can be increased, and the wall thickness of the main steel belt is much smaller that of a common steel pipe, so that the material cost is reduced, and steel pipes with large apertures and ultra large aperture can be manufactured; second, when the main steel belt is thinner, in a rounding process, a transfer force will curl the steel belt, so that the steel belt cannot be transferred, after the reinforcement ring is arranged, the cross sectional area and the inertia moment are greatly increased, and thus the steel belt can be transferred easily and is processed conveniently in the rounding process. Secondly, the linings are arranged on the inner wall of the steel pipe to avoid or reduce the corrosion and the abrasion of the fluid on the steel pipe and the pollution of the pipe body on the fluid, and meanwhile, the thickness of the main steel belt can be decreased to further reduce the material cost and improve the corrosion resistance and the abrasion resistance of the steel pipe. In addition, the end parts of the steel pipe are sealed and welded to provide the sealed space for vacuumizing or filling the inert gas. Since the air holes are arranged on the first or the second lining, the air in the sealed space can be effectively exhausted to prevent corrosion of the gap in the steel pipe, and the welding quality can also be detected. Since the antiseptic material is filled in the reinforcement ring, the corrosion resistance of the inner wall of the reinforcement ring can be improved.

The steel pipe of the present invention has the following usage: a water supply pipe or a drain pipe; conveyance of sand stones and dust; municipal wastewater and industrial wastewater; chemical fluid; an underground collector pipe; a high temperature medium; and a seawater pipeline, etc.

The invention claimed is:

1. A large-aperture spiral welded steel pipe with metal linings, comprising a pipe body spirally winded by a main steel belt, wherein a first lining and a second lining are arranged on an inner wall of the pipe body, the first lining is spirally laminated on the surface of the main steel belt, the width of the first lining is smaller than the width of the main steel belt, the second lining is spirally laminated on a spiral seam formed between adjacent pipe bodies, left and right sides of the second lining are respectively welded with the adjacent first lining, and the first lining and the second lining cover the inner wall of the entire pipe body; and a reinforcement ring with a semi-closed section is spirally arranged along an outer wall of the pipe body, and a spiral passage is formed between the inner wall of the reinforcement ring and the outer wall of the pipe body, wherein the passage between the inner wall of the reinforcement ring and the outer wall of the pipe body is filled with antiseptic liquid.

2. The large-aperture spiral welded steel pipe with metal linings of claim 1, wherein (1) an air hole for emptying air between the main steel belt and the first lining is arranged on the first lining or (2) an air hole for emptying air between the main steel belt and the second lining is arranged on the second lining, or (3) both (1) and (2).

3. The large-aperture spiral welded steel pipe with metal linings of claim 2, wherein the first lining or the second lining is lining steel made of special alloy steel, stainless steel, wear-resistant steel, aluminum or copper.

4. The large-aperture spiral welded steel pipe with metal linings of claim 1, wherein the first lining or the second lining is lining steel made of special alloy steel, stainless steel, wear-resistant steel, aluminum or copper.

5. A manufacturing method of the large-aperture spiral welded steel pipe with metal linings of claim 1, comprising the following steps:
   a reinforcement ring steel belt with a semi-closed section is laminated on a lower surface of the main steel belt, and a first lining steel belt is laminated on an upper surface of the main steel belt to form a composite main steel belt, wherein the width of the first lining steel belt is smaller than the width of the main steel belt;
   the composite main steel belt is spirally winded to the spiral welded steel pipe with the first lining on the inner wall and the reinforcement ring on the outer wall, and, the spiral passage is formed between the inner wall of the reinforcement ring and the outer wall of the pipe body of the steel pipe;
   the second lining is spirally winded on the spiral seam formed by adjacent pipe bodies on the inner wall of the pipe body, left and right sides of the second lining are respectively welded with the adjacent first lining, and the first lining and the second lining cover the inner wall of the entire spiral welded steel pipe, and
   the passage between the inner wall of the reinforcement ring and the outer wall of the pipe body is filled with antiseptic liquid.

6. The manufacturing method of the large-aperture spiral welded steel pipe with metal linings of claim 5, wherein after being manufactured, the spiral welded steel pipe is cut into segments, and a welding groove between two adjacent segments of steel pipes is Y-shaped.

7. The manufacturing method of the large-aperture spiral welded steel pipe with metal linings of claim 5, wherein after the spiral welded steel pipe is manufactured, interlayer gaps formed by the main steel belts on both ends thereof and the first lining or the second lining are sealed and welded.

8. The manufacturing method of the large-aperture spiral welded steel pipe with metal linings of claim 7, wherein (1) an air hole for emptying air between the main steel belt and the first lining is arranged on the first lining or (2) an air hole for emptying air between the main steel belt and the second lining is arranged on the second lining, or (3) both (1) and (2).

9. The manufacturing method of the large-aperture spiral welded steel pipe with metal linings of claim 8, wherein the interior of the air hole is vacuumized or filled with an inert gas.

10. The manufacturing method of the large-aperture spiral welded steel pipe with metal linings of claim 9, wherein after being manufactured, the spiral welded steel pipe is cut into segments, and a welding groove between two adjacent segments of steel pipes is Y-shaped.

11. The manufacturing method of the large-aperture spiral welded steel pipe with metal linings of claim 8, wherein after being manufactured, the spiral welded steel pipe is cut into segments, and a welding groove between two adjacent segments of steel pipes is Y-shaped.

12. The manufacturing method of the large-aperture spiral welded steel pipe with metal linings of claim 7, wherein after being manufactured, the spiral welded steel pipe is cut into segments, and a welding groove between two adjacent segments of steel pipes is Y-shaped.

* * * * *